United States Patent [19]

Still et al.

[11] Patent Number: 5,722,718
[45] Date of Patent: Mar. 3, 1998

[54] SEAT MOUNTING ASSEMBLY

[75] Inventors: John Scott Still; Jerry N. Shuler, both of Fort Collins, Colo.

[73] Assignee: Catamount Cycles II LLC

[21] Appl. No.: 707,370

[22] Filed: Sep. 4, 1996

Related U.S. Application Data

[60] Provisional application No. 60/003,431 Sep. 8, 1995.

[51] Int. Cl.[6] ................................................ B62J 1/10
[52] U.S. Cl. .............................. 297/215.15; 297/195.1; 297/207
[58] Field of Search ........................ 297/215.15, 195.1, 297/207

[56] References Cited

U.S. PATENT DOCUMENTS

| | | | |
|---|---|---|---|
| 3,891,333 | 6/1975 | Corderac'k | 297/215.15 X |
| 3,992,054 | 11/1976 | Campagnolo | 297/215.15 |
| 4,155,590 | 5/1979 | Cunningham | 297/215.15 |
| 4,180,345 | 12/1979 | Routens | 297/215.15 X |
| 4,421,357 | 12/1983 | Shimano | 297/215.15 X |
| 4,693,627 | 9/1987 | Borromeo | 297/215.15 X |
| 5,244,301 | 9/1993 | Kurke et al. | 292/215.15 X |
| 5,383,706 | 1/1995 | Chen | 297/215.15 |
| 5,466,042 | 11/1995 | Herman | 297/215.15 |
| 5,547,155 | 8/1996 | Herting | 297/215.15 X |
| 5,568,958 | 10/1996 | Chen | 297/215.15 |

Primary Examiner—Peter M. Cuomo
Assistant Examiner—Rodney B. White
Attorney, Agent, or Firm—Catamount Cycles II LLC

[57] ABSTRACT

Seat mounting assembly for a bicycle seat includes a base, a cradle supporting the bicycle seat above the base having a bearing surface of the base, a first clamp including a bolt and nut and head that tightens to lock the cradle to the base and it releases to allow the cradle to rotate relative to the base and a second clamp operable independently of the first clamp and in coaxial concentric arrangement with the first clamp locks the seat to the cradle to allow the seat to be moved front to rear relative to the base.

26 Claims, 2 Drawing Sheets

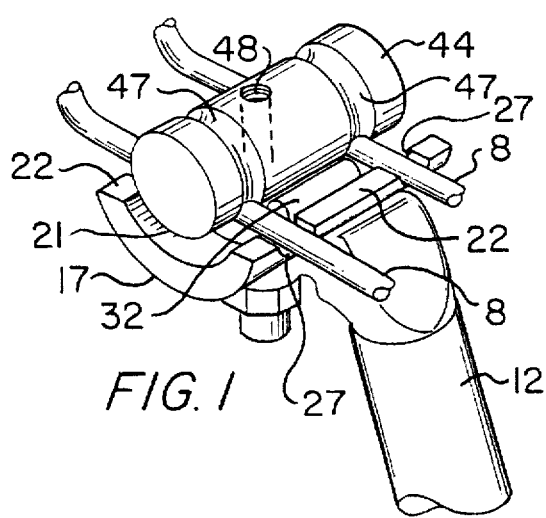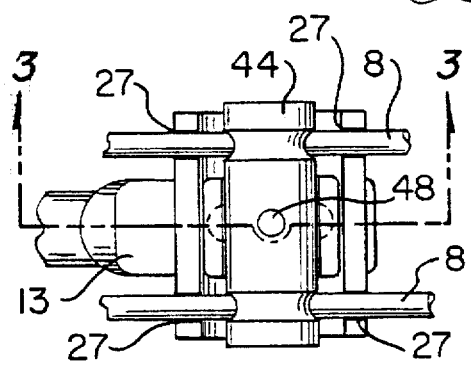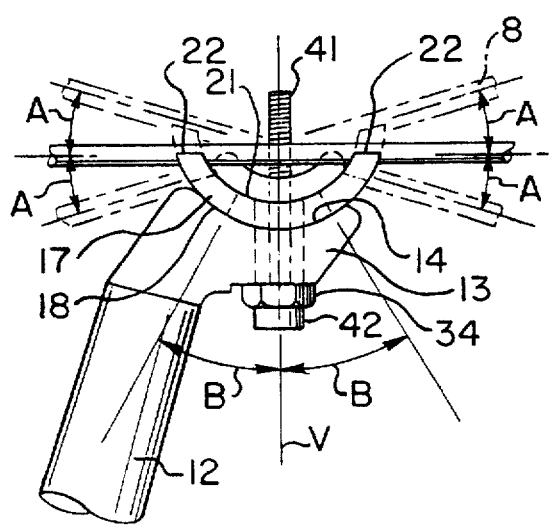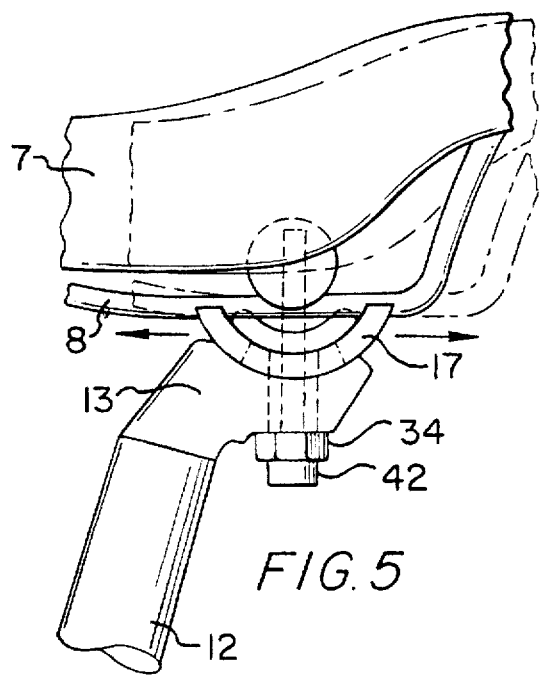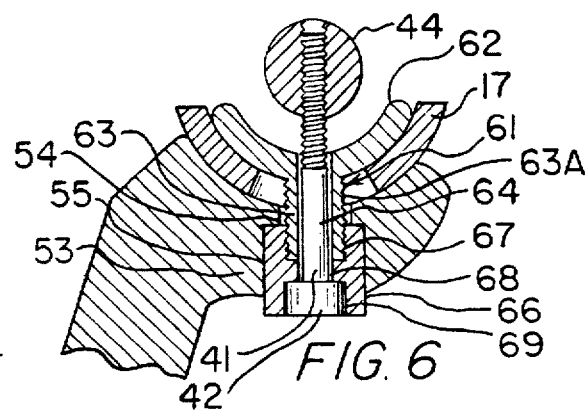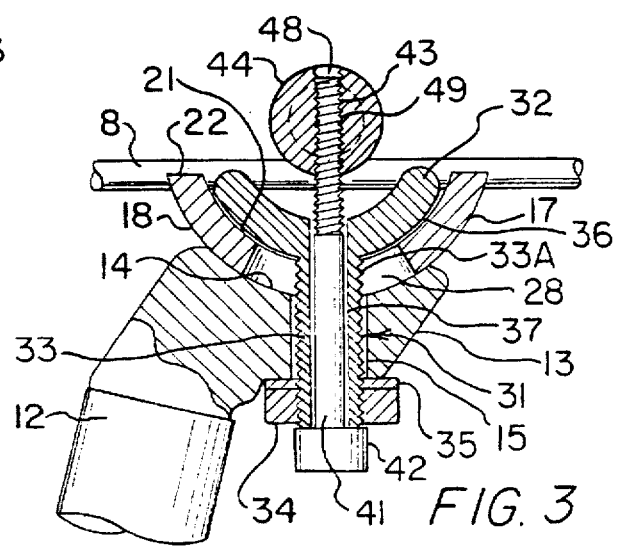

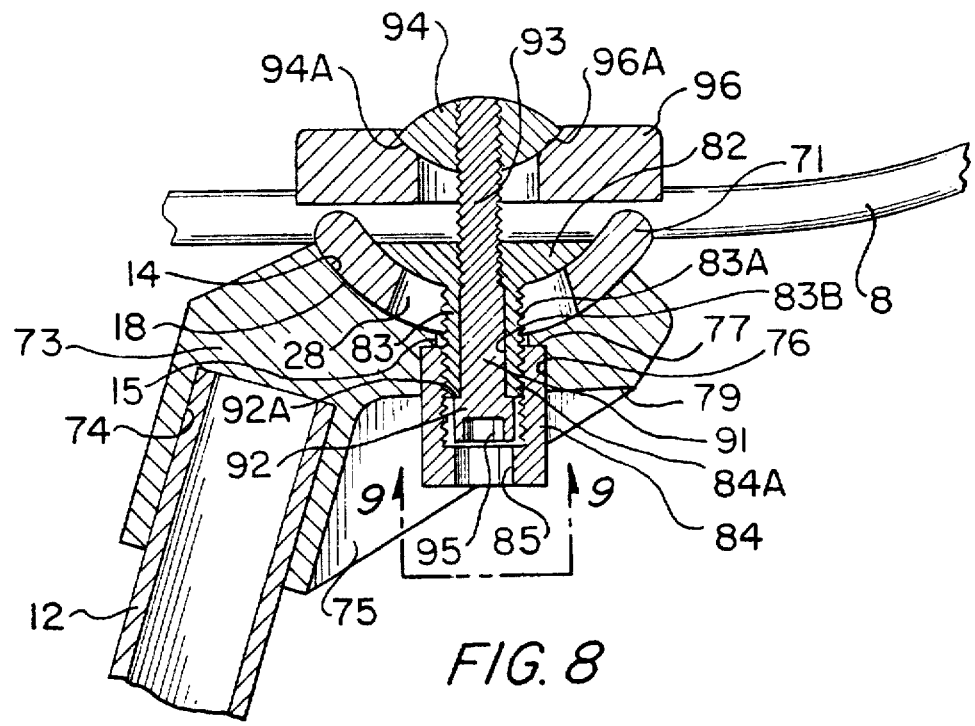
FIG. 8
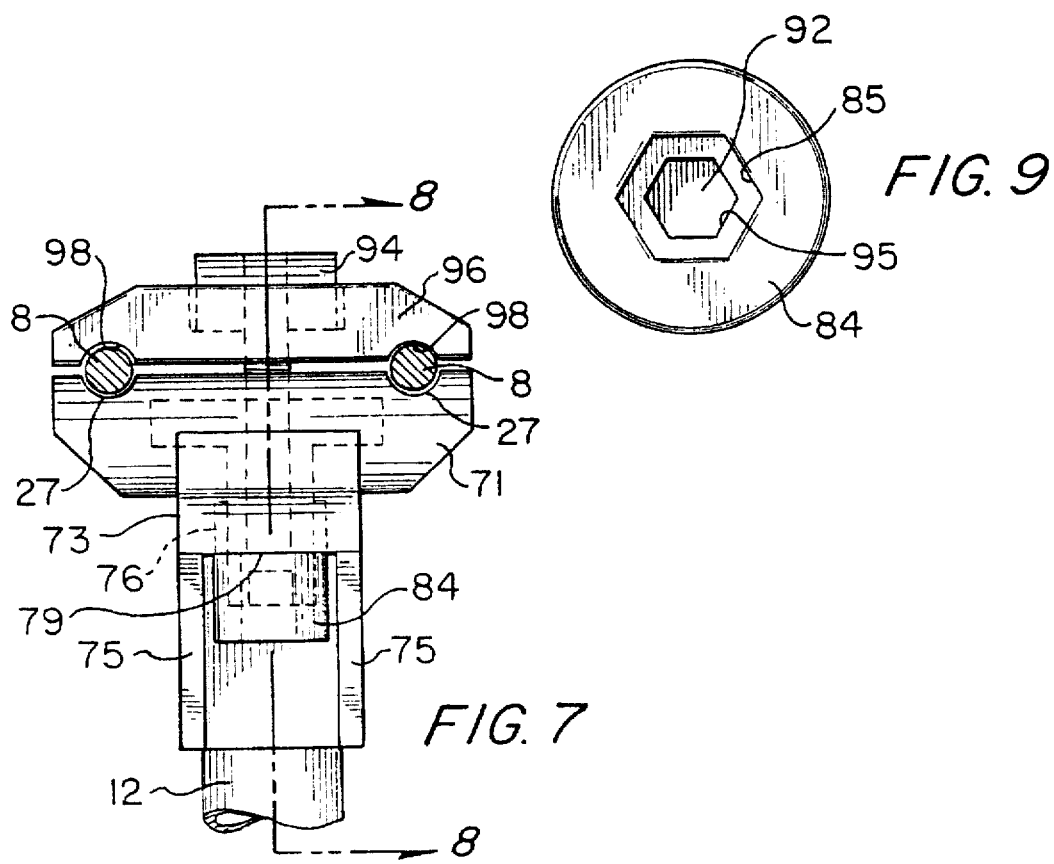
FIG. 9
FIG. 7

SEAT MOUNTING ASSEMBLY

This application claims benefit under 35 U.S.C. 119(e) of provisional application Ser. No. 60/003,431 filed Sep. 8, 1995.

TECHNICAL FIELD

This invention relates to vehicle seats and more particularly to a seat mounting assembly particularly suitable for bicycle seats having two independent clamping arrangements for tilt and longitudinal position adjustments.

BACKGROUND ART

Mounting assemblies for bicycle seats common in use have a clamp system with one (lower) clamping head rotatable on the seat post base and another clamping head spaced above the lower head with seat rails running between the two. A bolt extends through clamping heads to both clamp the lower head to the seat post base to set the tilt angle and clamp the rails between the two heads for longitudinal position adjustment.

DISCLOSURE OF THE INVENTION

In accordance with the present invention, there is provided a two stage adjustment for a seat mounting assembly which includes a rail tilt cradle having a convex bottom bearing surface that is complementary in shape with the concave top bearing surface of a seat support base. A tilt clamp has a head portion and a threaded bolt portion that extends through an elongated slot in the cradle and seat support base and upon externally threading a nut on the bolt, clamps the cradle securely against the seat support base thereby obtaining a desired tilt angle. A second adjustment independent of the first is a screw having external threads that extends through a throughbore in the tilt clamp and threads into a locking bar at the top which will fasten and set the longitudinal position independently of the clamping of the cradle (tilt). These enable the adjustment of either tilt or longitudinal position of the seat independently of one another.

BRIEF DESCRIPTION OF THE DRAWINGS

Details of this invention are described in connection with the accompanying drawings which like parts bear similar reference numerals in which:

FIG. 1 is a top front perspective view of a bicycle seat mounting assembly embodying features of the present invention with only a portion of the seat rails of a bicycle seat shown.

FIG. 2 is a top plan view of FIG. 1.

FIG. 3 is a sectional view taken along lines 3—3 of FIG. 2 but showing the entire assembly.

FIG. 4 is a side elevation view of the assembly with only the elements of the tilt angle adjustment shown and the elements for the longitudinal position adjustment removed except for screw 41.

FIG. 5 is a side elevation view showing the entire seat mount assembly as shown in FIG. 3 with a portion of the top of the seat shown and illustrating the longitudinal position adjustment with a rear position shown in dashed lines.

FIG. 6 is a sectional view of a modified form of the seat mounting assembly embodying features of the present invention wherein the adjustment nut and adjustment screw bolt are recessed in a thicker seat post base.

FIGS. 7 is a front elevation view of another embodiment of seat mounting assembly.

FIG. 8 is a sectional view taken along line 8—8 of FIG. 7.

FIG. 9 is a bottom plan view taken along line 9—9 of FIG. 8 showing the ends of the nut and screw heads.

DETAILED DESCRIPTION

Referring now to FIGS. 1–5 there is shown a conventional seat 7 having a pair of parallel spaced seat rails 8 as is commonly found on bicycles. There is further shown a conventional bicycle seat post tube 12 with the tube 12 having a seat support base 13 secured thereto and extending rearwardly from the tube in a conventional manner. The seat support base 13 has a concave or arcuate top bearing surface 14 formed along a selected radius. A vertical throughbore 15 is provided in a central area of the seat support base 13. A rail tilt cradle 17 movable on the seat support base is of an arcuate shape having a uniform cross section with a convex or arcuate bottom bearing surface 18. Bearing surface 18 is formed along a selected radius and is complementary in shape with that of the top bearing surface 14 of base 13. Cradle 17 is rotatable on the top bearing surface 14 through a selected range of tilt angles from the horizontal as indicated by angles designated A. The cradle 17 has a concave or arcuate top surface 21 and terminates in a pair of parallel spaced top edge portions 22. These edge portions have a pair of parallel spaced rail notches 27 in each edge portion 22 with the notches shaped and located to receive a portion of the seat rails 8 and have the seat rails releasably locked or clamped thereto. The cradle 17 also has an elongated longitudinal slot 28 which provides for a range of rotating movement preferably on the order of 15 degrees to each side of the vertical as indicated by angles designated B.

A tilt clamp includes a clamp body 31 having a head portion 32 and a bolt portion 33 having external threads 33A and a nut 34 that threads on the end of the bolt portion 33. The head portion 32 rests on and has a convex arcuate bottom surface 36 complementary in shape with that of the top surface 21 of the cradle 17. The bolt portion 33 extends through the cradle elongated slot 28 and the support base throughbore 15 and extends a distance below the bottom of the support base 13 to enable the nut 34 to be threaded thereon. The nut 34 threads on the bolt below base 13 and bears against a washer 35 that in turn bears against the underside of the seat support base 13 to releasably lock the tilt cradle 17. This enables the positioning of the seat 7 at a horizontal position relative to a flat surface, i.e. the ground, or a selected tilt angle position as desired. A throughbore 37 extends through the center of the head portion 32 and bolt portion 33. The clamp body 31 and nut 34 serve as a first clamping means to releasably lock the cradle 17 to the seat support base 13 at a horizontal position and through a selected range of tilt angles.

A screw 41 having a head 42 and external threads 43 extends upwardly from the bottom through the throughbore 37 in the clamp body 31 with the head 42 bearing against the bottom end of bolt portion 33. The center of the screw 41 is concentrically arranged about a common vertical axis V with the center of the tilt clamp body 31. A locking bar 44 of cylindrical shape is provided on top of the seat rails and has a pair of parallel spaced peripheral external grooves 47 that fit against the seat rails. The locking bar has a throughbore 48 and internal threads 49 into which the screw 41 threads and this then will clamp the locking bar against the top of the rails so as to be able to adjust the longitudinal position of the rails relative to the cradle and seat post base independently of the clamping of the cradle 17. With the head 42 of the screw 41 bearing against the bottom end of bolt portion 33, the seat rails are then clamped between locking bar 44 and cradle 17. The screw 41 threading into the locking bar 44 serves as a second clamping means to the tilt cradle 17 and clamp body 31 by locking the pair of rails 8 to the cradle 17 and seat support base 13. The screw 41 and bar 44 also serve a secondary function of clamping the entire assembly together.

In use, the mounting assembly is loosely assembled as shown with the seat rails 8 resting on the rail support notches or grooves 27. In use the seat tilt adjustment is performed first. This is done by tightening the tilt clamp body 31 and specifically the convexly curved bottom surface 36 of the head portion 32 against the concave top curved surface 21 of the cradle 17 by torquing the nut 34 and washer 35 against the underside of the support seat base 13. The seat adjustment tilt is now set. The tilt can be adjusted approximately 15 degrees up or down from the horizontal as shown in dashed lines. By way of illustration and not limitation, screw 41 is a 6 mm socket head screw and nut 34 is a 10 mm lock nut.

The longitudinal position or front-rear position (fore/aft) adjustment of the seat 7 is done next. The rail locking bar 44 is drawn down against the seat rails 8 by tightening of the screw 41. The seat is now set for riding use. To readjust the longitudinal position setting, loosen the screw 41 and reset rails 8 to a selected longitudinal position. Nut 34 is not loosened for tilt adjustment until the screw 41 is loosened first.

Referring now to FIG. 6 there is shown a modification of the seat mounting assembly wherein a seat support base 53 is made thicker. A modified tilt clamp body 61 has an arcuate head portion 62 with a shorter bolt portion 63 with threads 63A and a throughbore 64. The support base 53 has a throughbore 54 through which the bolt portion 63 extends and an enlarged bore section 55 in the bottom portion of base 53. A nut 66 is received in the enlarged bore section 55 and has internal threads 67 that thread on threads 63A. Nut 66 has a throughbore 68 through which the fastening screw 41 extends. The head 42 of the screw 41 is recessed in an enlarged bore section 69 in the nut 66. The operation of the modification is the same as the embodiment shown in FIGS. 1–5.

Referring now to FIGS. 7–9 there is shown another embodiment of the seat mounting assembly. This embodiment has a modified seat support base 73 shown as having the same concavely curved or arcuate top bearing surface 14 formed along a selected radius as previously described and a vertical throughbore 15 provided in the central area of the base 73. The thickness of base 73 is less than the thickness of the previously described base 13 and has a downwardly and rearwardly inclined female socket portion 74 at the front into which the seat post tube 12 extends and is rigidly secured. Base 73 also has a pair of parallel spaced ribs 75 extending from a flat bottom surface 79 of the base 73 to the bottom end of the socket portion 74 for strengthening or reinforcing purposes. The base 73 has an enlarged bore section 76 extending up through the bottom surface 79 with an inside radial surface 77 forming a bearing surface against which the circular nut 92 bears when tightening to lock the cradle to the base as hereinafter described.

The bicycle seat is the same as the above described and has a pair of parallel spaced rails 8. The cradle 71 is similar to cradle 17 above described. Cradle 71 is supported by the base 73 and has a convexly curved bottom second bearing surface 18 of a selected radius movable on the first bearing surface 14 through a horizontal position and selected at tilt angles similar to the previously described embodiments.

The first clamping arrangement for this embodiment again is a first fastener including a tilt clamp similar to 31 and 32 and including an elongated member in the form of a bolt 83 having external threads 83A that extend down through the throughbore 15 of the base 73 and having a head 82 at the upper end. The bolt 83 has a throughbore 83B coaxial with throughbore 15. Head 82 has a convexly curved bottom surface of a selected radius that fits against the top curved surface of the cradle 71. A nut 84 of cylindrical shape fits up into the enlarged bore section 76 coaxial with throughbore 15 and has internal threads 84A that thread over the threads 83A of the bolt portion in the same manner as above described. This nut 84 is longer and has an internal hex-shaped or multi-sided section 85 into which a tool (Allen-type wrench) will insert to rotate the nut and tighten the top surface of the nut 84 against the internal bearing surface 77 and cradle 71 against base 73 to lock the seat rails at either a horizontal or selected angular position as above described.

The second clamping arrangement for this embodiment is a second elongated member in the form of a screw 91 that extends through throughbores 83B and 15 and has external threads 93 that extend above the seat rails 8. This screw 91 has a head 92 at one end with internal Hex-shaped or multi-sided faces 95 into which the allen-type tool can be inserted to rotate screw 91. The head 92 has an internal radial surface 92A that bears against the bottom end of bolt 83 when tightening the head 92.

This embodiment has a locking cap 96 which bears down against the seat rails and a nut 94 fits in a convexly curved circular top surface 96A of a selected radius on the locking cap 96. The locking cap has a pair of parallel spaced grooves 98 that fit over the seat rails to provide a four point clamp against the seat rails. The nut 94 has a convexly curved bottom surface 94A of a selected radius that conforms and is complementary to the concavely curved top surface 96A of the locking cap 96. As with the above described embodiment in the first instance the circular nut 84 is tightened to tighten the head 82 against cradle 71 which, in turn, clamps to the base 73 to lock the seat to the base and the second adjustment is to turn the head 92 of the screw to first release the seat rails, move them to a selected front to rear or longitudinal position and then tighten the seat rails by turning the screw for a selected front to rear position for the seat so that the two clamping operations are independently operable relative to one another. To release the seat the reverse sequence is followed, i.e. loosening the screw 91 and then the nut 84.

Although the present invention has been described with a certain degree of particularity, it is understood that the present disclosure has been made by way of example and that changes in details of structure may be made without departing from the spirit thereof.

What is claimed is:

1. A bicycle seat mounting assembly comprising:
   a base having a first bearing surface,
   a cradle for supporting a bicycle seat above said base, said cradle having a second bearing surface movable on said first bearing surface through a horizontal position and range of tilt angles,
   first clamping means to releasably lock said cradle to said base at a horizontal position and a selected tilt angle, said first clamping means comprising a first fastener that tightens to lock said cradle to said base and releases to allow said cradle to move relative to said base, a second clamping means coaxial with and operable independently of said first clamping means to releasably lock a bicycle seat, said second clamping means comprising a second fastener extending upwardly through said first fastener, said second fastener tightens to lock a bicycle seat to said cradle and releases to allow said seat to move relative to said cradle.

2. An assembly as set forth in claim 1 wherein said base has a female socket portion at the bottom into which the top end portion of a seat post tube extends and is rigidly fastened, a flat bottom surface and a pair of spaced ribs extending from said bottom surface to said socket portion for strength.

3. An assembly as set forth in claim 1 wherein said base has a flat bottom surface providing surface for a washer and a nut of said first fastener.

4. An assembly as set forth in claim 1 wherein said base has a single vertical throughbore extending between a top surface and a bottom surface of said base.

5. As assembly as set forth in claim 4 wherein said base has an enlarged bore section having an inside radial surface in a bottom portion of said base and opens through a bottom surface of said base, said first fastener including a nut recessed in said enlarged bore section and applying a force against said inside radial surface when said nut is tightened.

6. As assembly as set forth in clam 1 wherein said first bearing surface is concavely curved along a selected radius and said second bearing surface is convexly curved along a selected radius which is the same as said first selected radius.

7. An assembly as set forth in claim 1 wherein said cradle is of an arcuate shape having a cross section of uniform thickness with said second bearing surface being a convexly curved bottom surface along a selected radius, said cradle having a convexly curved top bearing surface along a selected radius, an elongated center slot and a pair of parallel spaced top edge portions.

8. An assembly as set forth in claim 1 wherein said first fastener includes a first elongated member having external first threads, a first head at one end of said first elongated member and a first nut opposite said head that threads on said first threads.

9. An assembly as set forth in claim 8 wherein said first head has a convexly curved bottom surface of a selected radius that is complementary to the shape of a concavely curved top surface of a selected radius of said cradle to nest therein.

10. An assembly as set forth in claim 8 wherein said first nut is multi-sided for engagement by a tool to turn said first nut.

11. An assembly as set forth in claim 8 wherein said base has a vertical throughbore and said first nut is of a cylindrical shape and is partially recessed in an enlarged lower bore section in said base, said lower bore section being coaxial with said throughbore and said first elongated member telescopically received in said throughbore and lower bore section.

12. An assembly as set forth in claim 11 wherein said first nut has multi-sided first internal bore section adapted to receive a complementary shaped tool through a bottom of said first nut to turn said first nut.

13. An assembly as set forth in claim 8 wherein said first elongated member is a bolt with a throughbore and said first threads extend below said base.

14. An assembly as set forth in claim 1 wherein said first elongated member is a bolt with a throughbore and said first threads terminate within said base.

15. An assembly as set forth in claim 1 wherein said second fastener includes a second elongated member having external second threads extending through a throughbore in said first elongated member, a second head at one end of said second elongated member and a second nut that threads on said second threads.

16. An assembly as set forth in claim 15 wherein said second elongated member is a screw and said second threads are on said screw and extend above said cradle.

17. An assembly as set forth in clam 16 wherein said second head has a multi-sided second internal bore section above and coaxial with said first internal bore section adapted to receive a complementary shaped tool through a bottom of said first nut and through said first internal bore section to turn said screw.

18. An assembly as set forth in claim 16 wherein said second head has an inside radial surface that bears against the bottom end of said first elongated member when said second head is tightened.

19. An assembly as set forth in claim 16 wherein said second nut is of a cylindrical shape and said second threads extend along a diameter line of said cylindrical shape.

20. An assembly as set forth in claim 16 wherein said second nut has a pair of laterally spaced circumferentially extending grooves to receive and bear against a pair of spaced seat rails.

21. An assembly as set forth in claim 20 further including a locking cap between said second nut and a pair of spaced seat rails, said locking cap having a pair of laterally spaced grooves to receive and bear against said spaced seat rails.

22. An assembly as set forth in claim 21 wherein said second nut has a convexly curved bottom surface of a selected radius and a top surface of said locking cap has a concavely curved top surface of a selected radius and of complementary shape with said bottom surface whereby said nut is cradled in and free to rotate on said top surface.

23. A seat mounting assembly comprising:

a base having a first bearing surface means, a bicycle seat having a pair of spaced rails, a cradle supporting said spaced rails above said base, said cradle having a second bearing surface moveable on said first bearing surface through a horizontal position and a selected range of tilt angles, first clamping means to releasably lock said cradle and bicycle seat to said base at a horizontal position and a selected tilt angle, said first clamping means including a first bolt with a throughbore, a first head at one end of said first bolt and a first nut opposite said first head that threads on said first threads, and second clamping means coaxial with and operable independently of said first clamping means and clamped after said first clamping means is clamped and released before said first clamping means is released to releasably lock said set of rails to said cradle at a selected longitudinal position for the seat, said second clamping means including a screw extending through, coaxial with and telescoping in said throughbore with a second head at one end of said screw and second threads on said screw and a second nut that threads on said second threads.

24. A bicycle seat mounting assembly comprising:

a seat post base having a concave top surface of a selected radius and a flat bottom surface, a bicycle seat having a pair of spaced seat rails, a rail tilt cradle having a concave bottom surface of a selected radius complementary in shape with said top surface and slidable on said top surface through a selected range of tilt angles, said cradle having a concave top surface of a selected radius and terminating in a pair of spaced top support edge portions, said edge portions having notches shaped and located to receive a portion of said spaced seat rails, said cradle having an elongated slot, a tilt clamp having a head and an externally threaded bolt affixed to and extending transverse to said head, said head resting on the top surface of said cradle and said bolt extending through said cradle slot and below said bottom surface of said support base, a nut threaded on said bolt below and against said bottom surface of said support base to clamp said cradle and seat rails at a selected tilt angle, said bolt having a throughbore, and a screw having second threads extending through said bolt throughbore with a locking bar threaded on said second threads and bearing against the top of said seat rails to clamp said rails against said cradle at a selected longitudinal position of said rails relative to said cradle and seat post base independently of the clamping of said cradle and seat rails, said locking bar being of a cylindrical shape and said second threads extend along a diameter line of said cylindrical shape.

25. A bicycle seat mounting assembly comprising:

a seat post base having a concavely curved top surface of a selected radius, a bicycle seat having a pair of spaced seat rails, a rail tilt cradle having a concavely curved bottom surface of a selected radius complementary in shape with said top surface and slidable on said top surface through a selected range of tilt angles, said cradle having a concave top surface of a selected radius and terminating in a pair of spaced top support edge portions, said edge portions having notches shaped and located to receive a portion of said spaced seat rails, said cradle having an elongated slot, a tilt clamp having a first head and an externally threaded first bolt affixed to and extending transverse to said head, said first head resting on the top surface of said cradle and said first bolt extending through said cradle slot and said support base, a first nut threaded on said bolt below said support base to clamp said cradle and seat rails at a horizontal position and a selected tilt angle, said bolt having a throughbore, said first nut being cylindrical in shape and partially recessed in an enlarged bore section in the bottom of said bore and opening into a bottom surface of said bore, and a screw having a second head and second threads extending through said bolt throughbore and coaxial with said first bolt and a second nut in the form of a cylindrical locking bar threaded on said second threads and bearing against the top of said seat rails to clamp said rails against said cradle at a selected longitudinal position of said rails relative to said cradle and seat post base independently of the clamping of said cradle and seat rails, said second head being recessed in a bore section in said first nut.

26. A bicycle seat mounting assembly comprising:

a seat post base having a concavely curved top surface of a selected radius, a bicycle seat having a pair of spaced seat rails, a rail tilt cradle having a concavely curved bottom surface of a selected radius complementary in shape with said top surface and slidable on said top surface through a selected range of tilt angles, said cradle having a concave top surface of a selected radius and terminating in a pair of spaced top support edge portions, said edge portions having notches shaped and located to receive a portion of said spaced seat rails, said cradle having an elongated slot, a tilt clamp having a first head and an externally threaded first bolt affixed to and extending transverse to said head, said first head resting on the top surface of said cradle and said first bolt extending through said cradle slot and said support base, a first nut threaded on said bolt below said support base to clamp said cradle and seat rails at a horizontal position and a selected tilt angle, said bolt having a throughbore, said first nut being cylindrical in shape and partially recessed in an enlarged bore section in the bottom of said bore and opening into a bottom surface of said bore, and a screw having a second head and second threads extending through said bolt throughbore and coaxial with said first bolt with a locking cap on said rails and a second nut threaded on said second threads and bearing against the top of said locking cap to clamp said rails against said cradle at a selected longitudinal position of said rails relative to said cradle and seat post base independently of the clamping of said cradle and seat rails, said second head being recessed in a bore section in said first nut.

* * * * *